Dec. 24, 1968   A. M. A. MAJENDIE   3,418,458
VISUAL INDICATING DEVICES FOR AIRCRAFT
Filed May 21, 1963   2 Sheets-Sheet 1
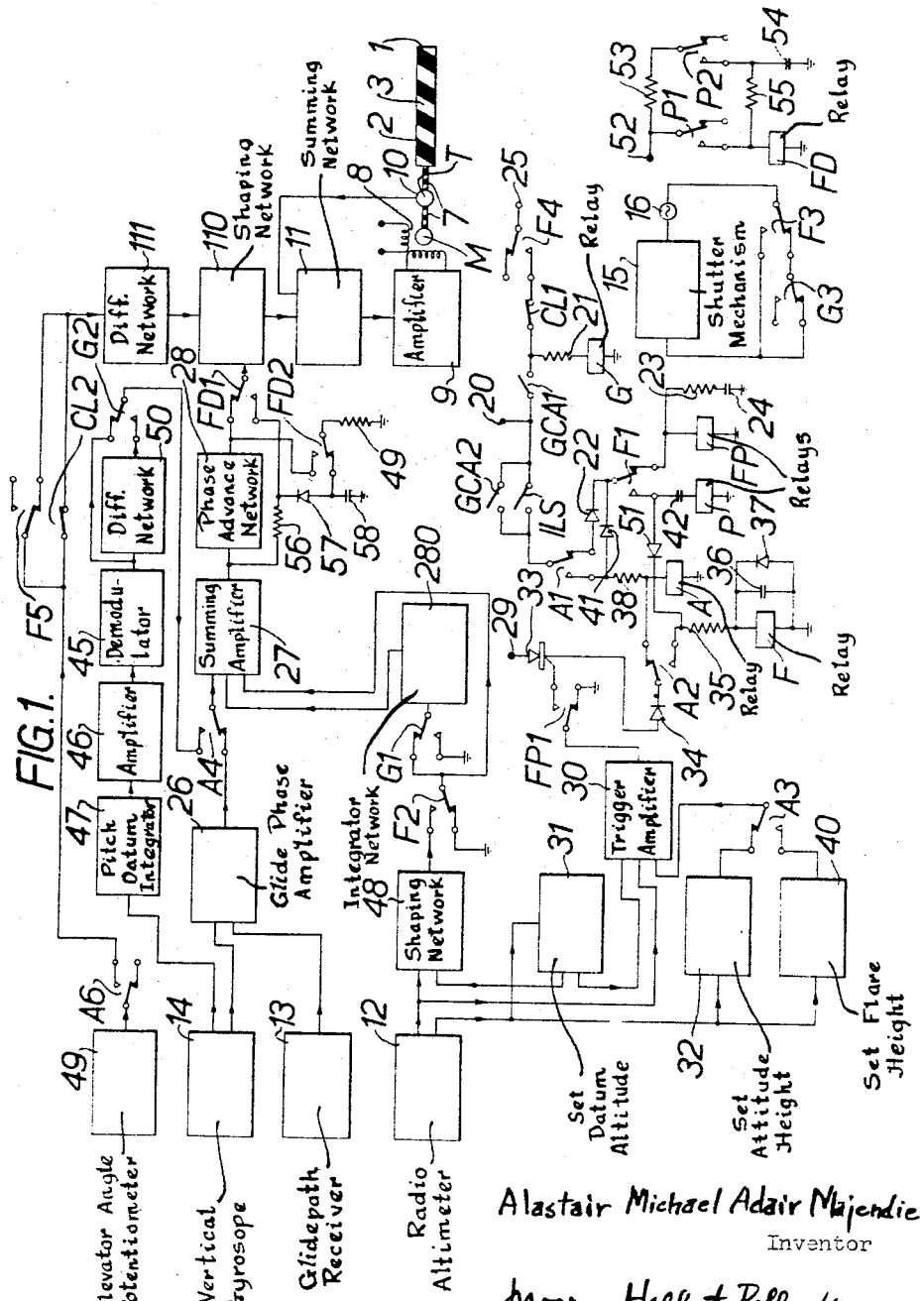
Alastair Michael Adair Majendie
Inventor
Moore, Hall & Pollock
Attorneys

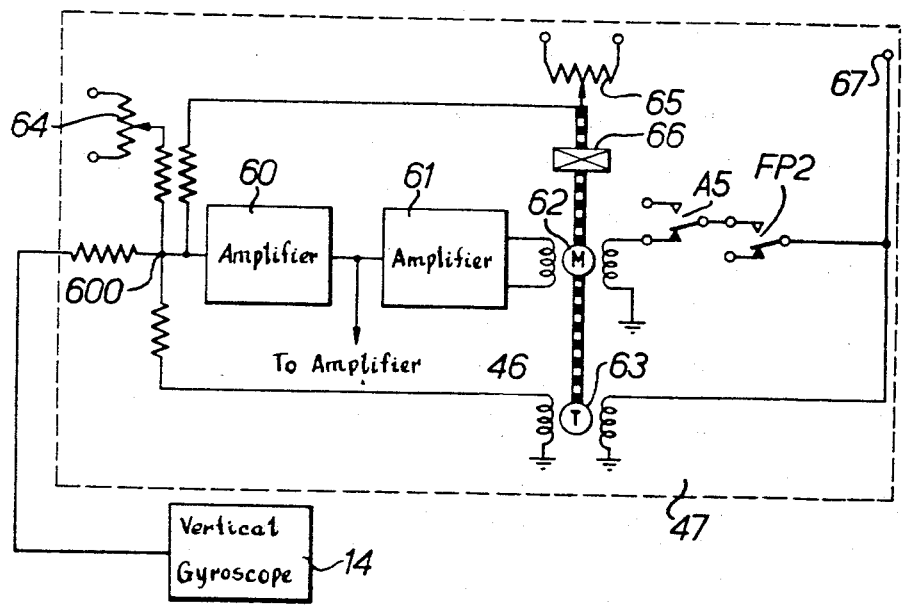

3,418,458
VISUAL INDICATING DEVICES FOR AIRCRAFT
Alastair Michael Adair Majendie, Cookham Dean, England, assignor to S. Smith & Sons (England) Limited, London, England, a British company
Filed May 21, 1963, Ser. No. 282,099
Claims priority, application Great Britain, May 22, 1962, 19,599/62
18 Claims. (Cl. 235—151.22)

This invention relates to visual indicating systems for aircraft.

The invention is particularly concerned with aircraft indicating systems which include visual indicating arrangements of the kind described and claimed in British Patent No. 853,034, corresponding to U.S. application No. 758,970, filed Sept. 4, 1958, now U.S. Patent No. 3,191,147, for "Variable Stimulus Peripheral Vision Indicator," issued June 22, 1965, and of the kind described and claimed in my prior U.S. application No. 66,208, filed Oct. 31, 1960, now U.S. Patent No. 3,085,429, issued Apr. 16, 1963, for "Visual Indicating Devices for Use in Aircraft." These indicating arrangements are used to provide assistance to a human pilot during the landing of an aircraft.

According to the present invention, a visual indicating system for use in an aircraft comprises an indicator arrangement for providing a moving optical stimulus, and adapted to be mounted at least near the periphery of the field of view of a pilot stationed in his operational position and looking forward through the aircraft windscreen. The system includes switching means responsive to a signal dependent upon the height of the aircraft and arranged to be switched to a predetermined state when, as represented by said signal, the aircraft has descended to a predetermined height. Computing means are also provided, said computing means being responsive to the state of said switching means and to signals dependent respectively upon the aircraft height $h$ relative to a predetermined level and upon the aircraft pitch attitude $\theta$, to derive and supply a signal to said indicator arrangement when said switching means is in said predetermined state. The signal so supplied to the indicator arrangement by said computing means has at least two components related to the change in pitch attitude required for flight of the aircraft in accordance with a predetermined path during the flare phase of landing. A first of said two components is representative of a predetermined function of the expression $(1+KD)h$, where K is a constant and D is the operator representative of differentiation with respect to time, and the second component is representative of a predetermined function of the pitch attitude $\theta$. The demand signal which is supplied by the computing means may include, in addition to said first and second components, a third component which is representative of a predetermined function of the aircraft elevator position. This latter function may be an algebraic linear function of elevator position, operated upon by a function of the operator D. The indicator arrangement is arranged to be responsive to the signal supplied thereto by the computing means so as to produce said moving optical stimulus at a rate and in a sense dependent upon the magnitude and sense respectively of said demanded change in pitch attitude.

The indicator arrangement may include at least one light source which is arranged to move, or to appear to move, in one or the other of two opposite directions in dependence upon the sense of the change in pitch attitude demanded by the signal supplied by the computing means. Preferably the indicator arrangement includes at least one cylindrical member mounted for rotation about its longitudinal axis, an enclosure for the cylindrical member which enclosure is provided with a longitudinal aperture for exposing a longitudinal strip of the cylindrical surface of said member, means for causing light to be radiated through said aperture from those parts of said cylindrical surface which are exposed by the aperture and which appertain to a continuous helical area of at least two complete turns of said cylindrical member, and means which is responsive to said signal supplied by the computing means to rotate the cylindrical member about its longitudinal axis at a rate and in a sense dependent respectively upon the magnitude and sense of the change in pitch attitude demanded by the signal.

The predetermined function of the expression $$(1+KD)h$$

may be a simple algebraic linear function of the expression. However it may also be a function which is linear in the expression, but which has coefficients that are functions of the operator D. Similarly, the predetermined function of the aircraft pitch attitude $\theta$ may be a simple algebraic linear function of $\theta$; but it also may be a function which is linear in $\theta$ but has coefficients which are functions of the operator D. Furthermore, it may be a function which includes a term demanding a predetermined change of pitch attitude with time corresponding to that applicable to the elevator channel of the automatic pilot which is described in Keston U.S. application 266,615, filed Mar. 20, 1963, for "Automatic Control Systems for Aircraft," now abandoned.

A visual indicating system in accordance with the present invention may be arranged to provide the pilot throughout landing with indications which, if followed, will guide him in correcty maneuvering the aircraft in pitch during the "glide phase" for which the aircraft is to fly along a radio-defined glidepath, and then during the "attitude phase" for which the aircraft is to fly along an extension of the glidepath, as well as during the subsequent flare phase. Accordingly, the computing means may have three modes of operation. In the first mode, the computing means is responsive to a signal dependent upon deviation of the aircraft from a radio-defined glidepath and supplies to said indicator arrangement a signal demanding change in aircraft pitch attitude required for flight along the glidepath. In the second mode, the computing means supplies to said indicator arrangement a signal which is dependent upon demanded change in aircraft pitch attitude required for flight along an extension of the glidepath. And in the third mode, the computing means supplies to said indicator arrangement said signal demanding change in aircraft pitch attitude required for flight along the path appropriate to the flare phase. In this case the switching means may be switchable from one to another of three states and may be arranged to be responsive to said signal dependent upon the height of the aircraft so as to be switched from a first to a second of the three states when the aircraft has descended to a first predetermined height applicable to change-over from the glide phase to the attitude phase, and to be switched from the second state to the third state when the aircraft has descended further to a second predetermined height applicable to changeover from the attitude phase to the flare phase. The arrangement is such that the computing means operates in its said first, second, and third modes respectively when said switching means is in said first, second and third states.

It will be appreciated with regard to the preceding paragraph that the glide path appropriate to the landing may be defined by the radio beams that are transmitted from the ground in connection with an instrument landing system (ILS) of the kind currently used by aircraft.

A visual indicating system in accordance with the present invention will now be described, by way of example, with reference to the accompanying drawings in which:

FIGURE 1 shows the system in block schematic form, together with the signal sources to which the system is coupled in operation;

FIGURE 2 shows a view in elevation of a particular form of indicating device which is used in the system of FIGURE 1 for providing a moving optical stimulus; and FIGURE 3 shows a circuit diagram of an integrator forming a part of the system of FIGURE 1.

Referring to FIGURES 1 and 2, the system includes a visual indicating arrangement which is adapted to provide a moving optical stimulus, the indicating arrangement in this case being similar to that described in British Patent No. 886,136, corresponding to my U.S. Patent No. 3,085,429 in that it includes as an indicating device a cylinder 1 which has a cylindrical surface which is painted with black and white helical bands 2 and 3 respectively. The cylinder 1, which is mounted for rotation about its longitudinal axis, is enclosed within a case 4 as shown in FIGURE 2, the case 4 having a longitudinal slot 5 which permits only a longitudinal strip of the surface of the cylinder 1 to be viewed. The interior of the case 4 is illuminated in operation, with the result that when the cylinder 1 is caused to rotate about its longitudinal axis, the visible parts of the white band 3 provide regions of illumination which appear to move in one direction or the other (depending upon the direction of rotation) along the length of the slot 5. The speed of the apparent linear movement is directly proportional to the speed of rotation of the cylinder 1.

Again as described in greater detail in British Patent No. 886,136, the indicating device of FIGURE 2 is intended to be mounted in the pilot's cabin of an aircraft at a position such that the viewable strip of the cylinder 1 lies within the periphery of the pilot's field of view when he is stationed in his operational position and is looking forward through the aircraft windscreen. The device is positioned to lie to one side of the pilot's line of sight when he is looking forward through the windscreen, with the longitudinal axis of the cylinder 1 approximately parallel, for example at some 20 degrees or less, to the line of sight. In operation, the cylinder 1 is caused (in a manner described later) to rotate to provide an indication to the pilot of demand for change in the aircraft pitch attitude during landing of the aircraft, the rate of rotation of the cylinder 1 being made dependent upon the magnitude of the demanded change. The sense of rotation is made such that the regions of illumination (of the white band 3) viewable through the slot 5 appear to move forward with respect to the aircraft when the pitch demand requires downward movement of the aircraft nose, and backward when the demand requires upward movement of the aircraft nose. As explained in the aforementioned British Patent Nos. 853,034 and 886,136, the indication provided by the device can be appreciated and followed by the pilot without looking directly at the device and while maintaining unimpaired observation through the aircraft windscreen. Preferably, although this is not shown in the drawings, the indicating device of FIGURE 2 is duplicated, the two devices lying to opposite sides of the pilot and arranged so that the movements provided thereby are both forward or backward with respect to the aircraft according to the sense of the demand signal. In addition, as described in British Patent No. 886,136, a further indicating device (not shown) may be provided lying transversely to the pilot's line of sight and controlled (by means not shown) such that it provides indications of the maneuvers required in azimuth during the landing of the aircraft.

Referring again to FIGURE 1, the cylinder 1 is driven by the output shaft 7 of an electric servo motor 8 the energization current for which is supplied through a servo amplifier 9. The shaft 7 also drives a tachometer generator 10 the output alternating current signal of which is supplied as degenerative feedback to a summing network 11. The summing network 11 controls, through the amplifier 9, the energization of the motor 8 in dependence upon the signal from the tachometer generator 10 and an input alternating current demand-signal which is applied to the network 11 and which is representative in amplitude and phase respectively of a demanded rate and sense of rotation of the cylinder 1. In known manner, therefore, the servo system constituted by the elements 7 to 11 operates to rotate the cylinder 1 at a speed and in a sense in accordance with the demand represented by the input demand signal applied to the network 11. The demand signal is supplied to the summing network 11 by means of a shaping network 110 which includes a magnetic amplifier (not shown), the demand signal being derived by the magnetic amplifier in dependence upon two input direct current signals. The shaping network 110, which also includes filters (not shown) for removing harmonic frequency modulation-components from the controlling D.C. signals, provides a limitation on the effective sensitivity of the servo system to small demands such that the cylinder 1 remains motionless unless the input demand exceeds a threshold value. This avoids demands for continual small adjustments of the aircraft's pitch attitude, which might otherwise arise.

The demand signal derived by the network 110 is dependent upon signals supplied by three signal sources, namely a radio altimeter 12, a glidepath radio receiver 13, and a vertical gyroscope 14. The radio altimeter 12 is of the frequency modulated type and in known manner provides two output direct current signals, one being representative of the aircraft's altitude actual and the other being a reference signal which may be regarded as representing a predetermined altitude (exceeding 300 feet) with the same constant of proportionality (altitude/voltage) as applied to the first-mentioned output signal representative of actual altitude. The glidepath receiver 13, which is of conventional form, is for use in receiving the signals from the radio beams transmitted by the glidepath transmitter of an ILS approach system of the kind which is currently provided at most airports, the receiver 13 providing a direct current signal representing the aircraft's angular deviation in the vertical plane from a predetermined glidepath as defined by the beams. The vertical gyroscope 14 may be of any known form and provides two alternating current signals which are both representative of the aircraft's pitch attitude.

The three signal sources 12 to 14 are coupled to computing and switching circuits of the system which are arranged to derive, in dependence upon the signals from these sources, the appropriate demand signal for the servo system (7 to 11) which controls rotation of the cylinder 1. The rotation of the cylinder 1 indicates to the pilot any requirement to change the aircraft's pitch attitude during either of two types of landing procedure. In a first type of landing procedure a radio-defined glidepath is followed before flaring out to land along a predetermined flare path after reaching a preselected altitude, for example an altitude in the range 50 to 150 feet. In the second type of landing procedure a visual or ground controlled approach (GCA) is made until the aircraft has reached a preselected altitude, say an altitude in the range 50 to 150 feet, after which a predetermined flare path is again followed. With the first procedure, once the glidepath has been acquired and the system set in operation, the movements of the cylinder 1 provide pitch guidance information throughout the whole landing procedure, while with the second procedure pitch guidance is provided during the flare phase only.

In the first type of landing procedure, which is referred to as the "ILS approach," there are three phases. The first of these is a "glide phase" in which the aircraft is to follow the glidepath, the second is an "attitude phase" in which the aircraft is to continue to fly down an extension of the glidepath maintaining a datum pitch attitude computed from the attitude subsisting during the glide phase, and the third is a "flare phase" in which the aircraft is to flare out to land on the runway following a predetermined exponential flare path. Switching from one phase to another is effected automatically within the computing and switching circuits at preselected altitudes under the control of the signals from the radio altimeter 12. Switching from the glide phase to the attitude phase is carried out for example (assuming the usual ILS glidepath angle of some three degrees to the horizontal) at some chosen altitude in the range 100 to 300 feet. Switching from the attitude phase to the flare phase is carried out at some chosen altitude (less of course than for the first switching) in the range 50 to 150 feet.

In order to provide the pilot of the aircraft with suitable guidance in pitch during the three phases of an ILS approach, the computing and switching circuits are arranged to operate in such a manner as to cause the shaping network 110 to derive a demand signal in the form of an electric current which, during the different phases, is given by the following equations.

During the glide phase:

$$I = K_{10}f_1(D)\{(\theta - K_{11}\beta) - \theta/(1+\tau_4 D)\} \quad (1)$$

where:

I is the demand current,
$K_{10}$ and $K_{11}$ are numerical constants,
$\theta$ is the aircraft's pitch angle in degrees, as measured by the vertical gyroscope 14,
$\beta$ is the aircraft's vertical displacement from the glidepath as measured in degrees and represented by the signal supplied by the glidepath receiver 13,
$\tau_4$ is a time constant which, for example, has a value of 30 seconds, and
$f_1(D)$ is the function $(1+N\tau_1 D)/(1+\tau_1 D)$ of the operator D, where N is a numerical constant (having a value, for example, within the range 1 to 8), and $\tau_1$ is a time constant (having a value, for example, within the range 0 to 0.2 second).

During the attitude phase:

$$I = K_1 f_1(D)(\theta - \theta_d) - GK_6 K_7 f_2(D)\eta \quad (2)$$

where

I, $f_1(D)$, and $\theta$ are as defined above,
$K_1$, $K_6$ and $K_7$ are numerical constants,
$\theta_d$ is a datum pitch angle computed during the glide phase by an integrator which has a time constant of, for example, 30 seconds, and which is supplied with signals representing the aircraft's pitch attitude,
$\eta$ is the aircraft's elevator angle in degrees,
G is a constant relating elevator angle to resultant pitch angle and is in terms of the number of degrees of pitch angle per degree of elevator angle, and
$f_2(D)$ is the function $(\tau_2 D)/(1+\tau_2 D)$ of the operator D, where $\tau_2$ is a time constant, for example of the order of one second.

During the flare phase:

$$I = K_6 f_1(D)\{(1+K_5 D)(h-h_d) + K_7 f_2(D)\theta\} - GK_6 K_7 f_2(D)\eta \quad (3)$$

where:

I, $K_6$, $f_1(D)$, $K_7$, $f_2(D)$, $\theta$, $\theta_d$, G, and $\eta$ are as defined above,
h is the aircraft's altitude as represented by the relevant signal from the radio altimeter 12,
$h_d$ is a datum altitude level towards which the flare path is asymptotic and which, although normally a few feet below ground level in order to achieve a positive touch down, may be set to lie anywhere between, for example, 10 feet above and below ground level, and
$K_5$ is a time constant, for example five seconds.

In the second type of approach, which is referred to as the "GCA or visual approach," the aircraft is to carry out from a preselected altitude, for example in the range 50 to 150 feet, a flare maneuver along the same exponential flare path as used during the flare phase of the ILS approach. Thus during the flare phase of the GCA or visual approach, the computing and switching circuits operate to supply to the shaping network 110 a demand signal according to Equation 3 above. During a GCA or visual approach and before the attainment of the height chosen for the commencement of the flare phase, the computing and switching circuits remain in operation, but the indicating device is masked, for example by closing a shutter (not shown) covering the slot 5 (FIGURE 2) in the case 4 of the cylinder 1. To this end, the indicating device has a shutter mechanism 15 (indicated as a block in FIGURE 1) which is normally closed and which opens and remains open only while energized from an A.C. voltage source 16. As described in detail below, an energizing circuit for the shutter mechanism 15 maintains the shutter open throughout an ILS approach, but only from the commencement of the flare phase of a GCA or visual approach. Any spurious indications produced before the flare phase of a GCA or visual approach are thus masked by the shutter.

Provision is make for selecting an alternative control law to that of Equation 3 for the flare phase of an ILS approach, the demand signal in this case being in the form of a current given by the equation:

$$I = K_2 f_1(D)\{\theta - \theta_d\} + K_3(1+1/K_4 D)(h-h_d)\} \quad (4)$$

where:

I, $f_1(D)$, $\theta$, $\theta_d$, $K_5$, h, and $h_d$ are as defined above,
$K_2$ and $K_3$ are numerical constants, and
$K_4$ is a time constant, for example four seconds.

As shown in FIGURE 1, the computing and switching circuits include three manually operable switches, ILS and GCA (having two contacts GCA1 and GCA2) which are both normally open, and a switch CL (having two contacts CL1 and CL2) which is normally closed. Closure of switch ILS conditions the circuits for operation during an ILS approach, while closure of switch GCA similarly conditions the circuits for operation during a GCA or visual approach. Switch CL is effective when in its normal closed position for the flare phase of a GCA or visual approach, to select the preferred control law of Equation 3, and when open to select the alternative control law of Equation 4. Switches GCA and ILS are provided with a mechanical interlocking arrangement (not shown) so that they cannot both be closed. With neither of the latter switches closed, all relays shown in FIGURE 1 are unenergized and the relay contacts have the positions shown.

When switch ILS is closed it completes a circuit from a terminal 20, which is maintained by a direct current source at a positive potential (for example 30 volts) with respect to ground, through a contact A1 of a relay A, a diode 22, a contact F1 of a relay F, and the winding of a relay FP, to ground. A resistor 23 and a capacitor 24 are connected in series with one another across the winding of the relay FP so as to render relay FP slow to release. If the switch ILS is closed when the aircraft is in a position suitable for intercepting a glidepath under control of the signals from the glidepath receiver 13, the altitude of the aircraft being greater than that selected (as described later) for the commencement of the attitude phase, there is no immediate changeover of either contact A1 or F1 from its position as shown in FIGURE 1, and relay FP is therefore energized. Energization of relay FP causes a changeover of a contact FP1 which, as described in detail below, results in energization firstly of relay A and then of relay F as the respective altitudes for the commencement of the attitude phase and for the commencement of the flare phase, are reached in turn. With only relay FP energized, the computing and switching circuits are set to generate the demand signal required for the glide phase (Equation 1); with relay A energized also, they are set to generate the demand signal required for the attitude phase (Equation 2); and finally, with relay F energized also, the circuits are set to generate the demand signal required for the flare phase (Equation 3).

When in normal circumstances the switch CL is kept closed, the energization of relay F results in energization of a relay G via a path from a terminal 25, which terminal is maintained by a direct current supply source at the same potential as the terminal 20, through contact F4 of the relay F, a resistor 21, and the winding of the relay G, to ground. Relay G has three contacts G1 to G3 connected in the circuits as shown in FIGURE 1, contacts G1 and G2 being employed in determining the form of the control law for the flare phase. Contact G3 is connected, together with contact F3 of the relay F, in the energization circuit of the shutter mechanism 15 such that while neither relay F nor G is energized, current from the source 16 is passed via contacts F3 and G3 to energize the shutter mechanism 15 and maintain the shutter of the cylinder 1 open. When, as in the ILS approach with the normal flare phase, the relay F is energized prior to the energization of relay G there is no break in the supply of energization current to the shutter mechanism 15, the changeover of contact F3 merely establishing an alternative path for the current from the source 16, so that the shutter remains open throughout.

For a GCA or visual approach, switch contacts GCA1 and GCA2 are both closed. Contact GCA1 completes a circuit from the terminal 20, through the resistor 21 and the winding of the relay G to ground, thereby effecting energization of the relay G. Since at this time the relay F is not energized so that contact F3 has the position shown in FIGURE 1, the consequent changeover of contact G3 breaks the supply of energization current to the shutter mechanism 15 with the result that the shutter closes over the cylinder 1. The closure of the other contact GCA2, which is in parallel with switch ILS, on the other hand causes the switching circuits involving the relays FP, A and F to operate in exactly the same manner as for the ILS approach. The resultant operation of the computing circuits until the flare phase is reached is however of no consequence, because it is not until the commencement of the flare phase with the energization of relay F and the consequent changeover of contact F3, that the shutter mechanism 15 is energized and the shutter is open to render the cylinder 1 visible.

If for an ILS approach switch CL is opened, the operation of the switching circuits is the same as for the normal ILS approach (that is to say for the ILS approach with the switch CL closed) with the exception that the relay G is not energized. The effect of not energizing relay G is to modify the ILS approach only in respect of the flare phase, the demand signal during this latter phase being derived in accordance with Equation 4 instead of Equation 3.

Considering first a normal ILS approach, the switch ILS is closed, thereby energizing relay FP, when the aircraft is in a suitable position relative to the ILS radio beams. Assuming the aircraft's altitude is greater than that selected (as described later) for the commencement of the attitude phase, only relay FP of the relays FP, A and F is energized, and a glide phase computer 26 is as a result connected by contact A4 of relay A to one of three inputs of a summing amplifier 27. The other two inputs of the summing amplifier 27 are at ground potential at this stage, one being connected to ground through a contact F2 of relay F, and the other being connected to the output of an integrating network 280 the input terminal of which is connected to ground through contacts G1 (of the relay G) and F2. Computer 26 receives signals respectively representing $\beta$ and $\theta$ from the glidepath receiver 13 and the vertical gyroscope 14, and operates to generate therefrom a direct current signal representing the quantity $$(\theta - K_{11}\beta) - \theta/(1+\tau_4 D)$$

which signal is passed by the summing amplifier 27 through a phase advance network 28 and a contact FD1 of a relay FD to the shaping network 110. (The function performed by the glide phase computer 26 may already be performed in the normal flight system of the aircraft, and in this respect it may not be necessary to provide the separate computer which is shown in FIGURE 1 for deriving the above signal.) The network 28, which is a resistance-capacitance network, has a transfer function $$(1+N\tau_1 D)/(1+\tau_1 D)$$

so that the direct current signal supplied to the shaping network 110 is in accordance with Equation 1 above.

The demand signal is derived by the shaping network 110 to be representative of the quantity which is represented by the direct current control signal supplied through the contact FD1 when reduced by the quantity which is represented by another direct current control signal received from a differentiating network 111. There is zero output signal for the differentiating network 111 while the relay A is not energized. The relay A is not energized until the commencement of the attitude phase so that the signal which during the glide phase is supplied as described above to the shaping network 110 via the contact FD1, that is to say, the signal which is in accordance with Equation 1, effects the control of the cylinder 1 appropriate to guidance in pitch for the glide phase.

So-called "height switching" circuits of the system which provide for changeover from one phase of operation to another according to the altitude of the aircraft, are operative during the glide phase to ensure that when the aircraft descends to the height selected for the commencement of the next phase, the attitude phase, the required changeover is achieved. The height switching circuits include a "height trigger" amplifier 30 which receives three input signals. A first of these input signals is the signal which is representative of the aircraft's actual altitude $h$, and is supplied by the radio altimeter 12; a second of these input signals is a signal which is representative of the datum altitude level $h_d$ for the ILS approach, and is supplied by a "set datum altitude" network 31; and the third of these signals is a signal which, during the glide phase, is applied through a contact A3 of the relay A from a "set attitude height" network 32. The set datum altitude network 31 and the set attitude height network 32 are provided by two potentiometers (not shown) respectively, the movable taps of which are set by the pilot prior to commencement of the ILS approach. The potentiometer tap of the network 31 is set in accordance with the selected value of the datum level $h_d$, and the potentiometer tap of the network 32 is set in accordance with the selected height above the selected datum level within the range (100 to 300 feet) at which changeover from the glide phase to the attitude phase is to take place. The potentiometers of the networks 31 and 32 are supplied with the reference signal from the radio altimeter 12 in such a manner that the signals tapped off from the potentiometers, and thence supplied by the networks 31 and 32 to the amplifier 30, are representative respectively of the selected datum level $h_d$ and the selected glide-attitude changeover height above the datum level.

The amplifier 30 operates to provide zero output as long as the quantity $(h-h_d)$, as represented by the difference between the signals from the altimeter 12 and the network 31, is greater than the height represented by the signal received via the contact A3; and amplifier 30 provides a finite output as soon as the quantity $(h-h_d)$ becomes equal to this height. The output signal from the amplifier 30 is applied through contact FP1 (relay FP being energised as previously described) to the gate electrode of a silicon-controlled retifier 33. The anode of the rectifier 33 is connected to a terminal 29 to which in operation unsmoothed positive-going halfwave-rectified A.C. voltage is applied. The cathode of rectifier 33 is connected through a diode 34 to the moving member of contact A2 of relay A. One of the two fixed members of contact A2 is connected through a resistor 35 and the winding of relay F to ground. A capacitor 36 and a diode 37 are each connected across the winding of relay F, so as to render relay F slow to energize. The other fixed member of contact A2 is connected through the winding of relay A to ground, and its junction with the winding of relay A is connected through resistor 38 to the contact A1 which is referred to above in connection with the circuits involving the switches ILS and GCA. When, as in the circumstances under consideration, the switch ILS is closed as a result of the selection of the ILS approach, the path including the contact A1 provides a holding circuit for the relay A which circuit is operative once the relay A is energized. Energization of the relay A effects a change in position of the contact A1, with the result that current is supplied to the winding of relay A from the terminal 20 via contacts ILS and A1 so as thereby to hold relay A energized.

In the present circumstances, during the glide phase with the relay A not energized, the signal supplied to the amplifier 30 via the contact A3, being derived from the network 32, is representative of the selected glide-attitude changeover height above the datum level with the result that the amplifier 30 provides its finite output signal to trigger the rectifier 33 when the aircraft has descended to this height. Current then flows via the anode-to-cathode path of the rectifier 33 during a positive-going half cycle of the supply to the terminal 29, such current flowing through the diode 34, the contact A2 (which is still in the position as shown in FIGURE 1), and the winding of relay A. The relay A is therefore energized causing changeover of the contacts A1 to A4 and with them changeover from the glide phase to the attitude phase. Contact A1 now completes the holding circuit (referred to above) for relay A, but at the same time maintains the path, previously through the diode 22 and now through a diode 41, to the contact F1. Contact A2 now connects the rectifier 33 in the alternative circuit including the winding of relay F. However relay F does not become energized as a result of the establishment of this connection by virtue of the "slow-to-energize" function provided by the capacitor 36 and diode 37. Contact A3 now connects a "set flare height" network 40, instead of the set attitude height network 32, to the trigger amplifier 30, whereas contact A4 disconnects the output of the glide phase computer 26 from the summing amplifier 27 at the time, thus establishing a new input connection to the amplifier 27.

The rectifier 33 returns to its normal nonconducting state at the conclusion of the positive-going half-cycle of the supply to the terminal 29, and is not triggered during the next positive-going half-cycle because the output from the amplifier 30 has by then returned to zero. In this connection, the signal received by the amplifier 30 from the network 40 is representative of a smaller value of height than that represented by the signal from the network 32.

The network 40 is similar to the network 32 in that it is provided by a potentiometer (not shown) which is supplied with the reference signal from the radio altimeter 12, and in that its tap is set by the pilot in accordance with a selected height. The setting of the tap in the present case is however in respect of the height above the selected datum level (within the range 50 to 150 feet) at which the changeover from the attitude phase to the flare phase is to occur. The signal tapped off from the potentiometer in network 40 and thence supplied to the amplifier 30 is thus representative of the attitude-flare change-over height above the datum level. Thus, as soon as the relay A is energized in the changeover from the glide phase to the attitude phase, there is zero output from the amplifier 30 until the aircraft has descended to this height. The finite output signal from the amplifier 30, when the aircraft has descended to this attitude-flare changeover height, again triggers the rectifier 33. The resulting conduction of the rectifier 33 this time effects energization of the relay F (relay A being already energized so that the position of contact A2 is changed from that shown in FIGURE 1), and, in consequence, also effects changeover of contacts F1, F2 and F4 to commence the flare phase. Changeover of contact F1 releases relay FP and completes a hold circuit for relay F from the terminal 20 through the switch ILS, the contact A1, diode 41, contact F1, and diode 51. Release of relay FP and the consequent change in position of contact FP1, breaks the connection between the amplifier 30 and the rectifier 33 and thus prevents further triggering of the rectifier 33.

When contact F1 changes over upon energization of the relay F at the commencement of the flare phase, a pulse of the current from the terminal 20 is passed via a capacitor 42 to the winding of relay P thus causing relay P to be energized momentarily. The purpose of this momentary energization of relay P is described later.

Returning to the computing circuits, at the end of the glide phase of an ILS approach relay A becomes energized. The consequent changeover of contact A4 replaces the input connection to the summing amplifier 27 from the computer 26 by a connection via a contact G2 from the output of a demodulator 45 (contact G2 having the position shown in FIGURE 1 since relay G is not energized until the flare phase in an ILS approach). Demodulator 45 receives the output signal of an amplifier 46 which in turn receives the output signal of a "pitch datum" integrator 47. The integrator 47 has a time constant of about 30 seconds and receives from the vertical gyroscope 14 the alternating current signal representing the aircraft's pitch angle. During the glide phase the integrator 17 operates to compute a datum pitch angle $\theta_d$ representing the average pitch angle subsisting during the glide phase. At the commencement of the attitude phase however, the circuits of the integrator 47 are switched by a contact A5 (not shown in FIGURE 1) of relay A so that thenceforward the integrator 47 supplies to the amplifier 46 an alternating current signal representing $(\theta-\theta_d)$, where $\theta$ is the current value of the aircraft's pitch attitude. This signal is passed through the amplifier 46 to the demodulator 45 which produces a corresponding direct current signal. This direct current signal is passed from the demodulator 45 to the summing amplifier 27 via contacts G2 and A4, and thence through network 28 to the shaping network 110 via contact FD1. The signal received by the shaping network 110 via the contact FD1 is representative of $$K_1 f_1(D)(\theta-\theta_d)$$

The shaping network 110 receives during the attitude phase a finite signal from the differentiating network 111, the operation of the relay A at the end of the glide phase having established via contact A6 a connection to the network 111 from an "elevator angle" potentiometer 49. The potentiometer 49 is supplied with direct current of constant magnitude and has a wiper (not shown in FIGURE 1) which is positioned according to the aircraft's elevator angle $\eta$. The signal derived by the wiper of the potentiometer 49 is supplied via the contact A6 to the differentiating network 111 which derives therefrom a direct current signal representative of $$GK_6 K_7 f_2(D)\eta$$

where $f_2(D)$ is the function $(\tau_2 D)/(1+\tau_2 D)$. This signal is applied to the shaping network 110 so that during the attitude phase the shaping network 110 supplies a demand current in accordance with Equation 2.

When there is the changeover from the attitude phase to the flare phase, the relay F becomes energized in addition to the relay A. The consequent change in position of the contact F4 results in energization of relay G also, so that, by virtue of the consequent changeover of the contact G2, the signal now supplied to the summing amplifier 27 via the contacts G2 and A4 is taken from a differentiating network 50 rather than directly from the demodulator 45. The differentiating network 50, which is similar to the differentiating network 111 in that it has the same time constant $\tau_2$, receives the signal representative of $(\theta-\theta_d)$ still supplied by the demodulator 45, and derives therefrom a signal representative of $$K_6 K_7 f_2(D)(\theta-\theta_d)$$

This latter signal is the signal now supplied to the summing amplifier 27 via the contacts G2 and A4.

The energization of the two relays F and G causes the contacts F2 and G1 to change over so that whereas there is still no input signal to the integrating network 280, the output signal of the shaping network 48 is supplied, via the contact F2, to the summing amplifier 27.

The network 48 has a transfer function given by $(1+K_5 D)$, where $K_5$ is a time constant having a value (for example within the range of 4 to 8 seconds) depending upon the constant of the exponential path which is to be followed during the flare phase. The signals representative of $h$ and $h_d$ are supplied to the network 48 from the radio altimeter 12 and the set datum altitude network 31 respectively. The signal representative of $h_d$ is combined subtractively in the network 48 with the signal representative of $h$ so that the output signal supplied from the network 48 to the summing amplifier 27 is representative of $$(1+K_5 D)(h-h_d)$$

The summing amplifier 27 combines additively the signals it receives from the networks 48 and 50 and supplies the resultant sum signal to the phase advance network 28. The signal which is, as a result, supplied from the network 28 to the shaping network 110 via contact FD1 is therefore representative of $$K_6 f_1(D)\{(1+K_5 D)(h-h_d)+K_7 f_2(D)(\theta-\theta_d)\}$$

Since the value of $(\theta-\theta_d)$ is zero at the commencement of the attitude phase, there is no transient term due to the term $\theta_d$ either during the attitude or flare phases. The term $K_7 f_2(D)(\theta-\theta_d)$ in the above expression is therefore effectively $K_7 f_2(D)\theta$.

The energization of relays F and G does not affect the supply to the shaping network 110 of the signal which is derived from the differentiating network 111 and which is representative of $$G K_6 K_7 f_2(D)\eta$$

In consequence the demand current supplied to the shaping network 110 during the flare phase is as represented by Equation 3.

With some aircraft in some circumstances, it has been found that there is a tendency for the system described above to give an indication demanding a "nose-down" maneuver at the commencement of the flare phase when the pilot would normally expect a "nose-up" demand. It has been found, for example, with some aircraft that when landing into the wind the rate of descent is too slow, this leading to the "nose-down" maneuver demand. As a "nose-down" indication during the flare phase is disconcerting for the pilot, provision has been made in the present arrangement for minimizing this effect as it arises. The particular means by which the effect is minimized involves the relays P and FD and their respective pairs of contacts P1 and P2, and FD1 and FD2.

The relay P, as previously described, is energized momentarily when the contact F1 changes over at the commencement of the flare phase, so that the contacts P1 and P2 change their positions from those shown in FIGURE 1. Changeover of contact P1 completes a circuit from a terminal 52, which is maintained at the same potential as the terminal 20, through the winding of relay FD, to ground, so that the relay FD is energized. Changeover of contact P2 on the other hand completes a circuit from the terminal 52 and through a resistor 53 for charging a capacitor 54.

When the contacts P1 and P2 revert to the positions shown in FIGURE 1 after the momentary energization of relay P, the capacitor 54 discharges through a resistor 55 and the winding of the relay FD in series, so as to maintain the relay FD energized for a period of, for example, two seconds. In this respect, the resistor 55 has a much larger value than the resistor 53 so that the time constant for the discharging of the capacitor 54 is much larger than that for the charging.

The energization of the relay FD and the consequent changeover of its contacts FD1 and FD2, has the effect of connecting a delay network into the path by which a signal is passed via the contact FD1 to the shaping network 110, this delay network being arranged to be effective only for currents demanding a "nose-down" maneuver and being connected in the path only while the relay FD is energized. The delay network is formed by a resistor 56, a diode 57 and a capacitor 58, the capacitor 58 being maintained in a discharged condition while the relay FD is not energized by virtue of a discharge path through contact FD2 and a further resistor 59. (According to a modification of the delay network the capacitor 58 is omitted, the diode 57 being connected directly between the resistor 56 and ground.) When contacts FD1 and FD2 change over on energization of relay FD, contact FD2 connects the output of network 28 to ground through the resistor 59, whereas contact FD1 connects the delay network in place of the phase advance network 28 between the output of the summing amplifier 27 and contact FD1. Diode 57 is connected so that the delay is effective for negative-going signals (corresponding to "nose-down" demands) only, positive-going signals being passed through without delay. Contacts FD1 and FD2 change back after the predetermined time for which relay FD is energized, with the result that demands for "nose-down" maneuvers at the commencement of the flare phase are not presented to the pilot unless such demands are large or sustained.

If the switch CL is opened in order to select the alternative control law of Equation 4 for the flare phase of the ILS approach, the opening of contact CL1 ensures that relay G does not become energized when relay F is energized at the commencement of the flare phase. The contacts G1 and G2 therefore remain in the positions shown in FIGURE 1 with the result that the signal supplied to the summing amplifier 27 via the contacts G2 and A4 during the flare phase is, as for the attitude phase, derived directly from the demodulator 45 and is representative of $(\theta-\theta_d)$.

With the contact G1 in the position shown in FIGURE 1, and the position of contact F2 changed as a result of energization of the relay F at the commencement of the flare phase, the signal representative of $$(1+K_5 D)(h-h_d)$$

supplied by the shaping network 48 is passed to the integrating network 280 as well as directly to the summing amplifier 27. The network 280 has a transfer function $(1/K_4 D)$ for which the time constant $K_4$ has a value of the order of 4 seconds.

The output signal from the network 280 is supplied to the summing amplifier 27 so that the output signal from the amplifier 27 in this case is representative of $$K_2\{(\theta-\theta_d)+K_3(1+1/K_4 D)(1+K_5 D)(h-h_d)\}$$

The opening of contact CL2 ensures that during the flare phase of the ILS approach the supply of the signal from the potentiometer 49 to the differentiating network 111 is broken. A contact F5 of the relay F is connected in parallel with the contact CL2 so that when the contact CL2 is open the supply of this signal is maintained during the attitude phase, but ceases when the relay F is energized at the commencement of the flare phase. In these circumstances therefore, during the flare phase, there is zero output signal from the differentiating network 111 with the result that the demand signal supplied by the shaping network 110 is in accordance with Equation 4.

During a GCA or visual approach the pilot is only concerned with operation of the computing circuits during the flare phase, that is, after relay F as well as relay A has been energized. The closure of contact GCA1 of switch GCA in this case has the same effect as the closure of switch ILS for an ILS approach. However the closure of contact GCA2 as well, results in energization of relay G before that of relay F. In these circumstances the energization circuit for the shutter mechanism 15 is broken by the changeover of the contact G3 in the absence of changeover of the contact F3. The shutter mechanism 15 is therefore energized only when the relay F is energized at the commencement of the flare phase, so that the movements of the cylinder 1 are visible to the pilot during the flare phase only. During the flare phase the demand signal which is supplied by the shaping network 110 is, of course, derived in exactly the same manner as for the flare phase according to Equation 3 (switch GL closed) of the ILS approach.

FIGURE 3 shows a circuit diagram of one possible form of the pitch datum integrator 47, this being shown (within the dotted block 47 in FIGURE 3) together with the vertical gyroscope 14.

The integrator 47 is a conventional electromechanical integrator including two amplifiers 60 and 61 in cascade, a two-phase electric motor 62 the control phase winding of which is energized by the output signal of the amplifier 61, and a tachometer generator 63 which is driven by the motor 62. The voltage generated in the tachometer generator 63 in operation is fed back to a star point 600 at the input of amplifier 60. The alternating current signal which is supplied by vertical gyroscope 14, and which represents the aircraft's pitch angle $\theta$, is supplied to the star point 600 together with two other alternating current signals, one from the movable tap of a "glide datum" potentiometer 64 and the other from the movable tap of a "pitch datum" potentiometer 65. The potentiometers 64 and 65 are both connected across a source of alternating current voltage the two terminals of which are balanced with respect to ground. The tap of the potentiometer 65 is driven by the motor 62 through reduction gearing 66, whereas the tap of the potentiometer 64 is set manually to a position such that the tap of the potentiometer 65 is positioned centrally by the motor 62 when the aircraft is flying down the glide path.

The reference phase winding of the motor 62 is energized from a terminal 67 (which is supplied in operation with alternating current) only when contact A5 of relay A (FIGURE 1) is in the position shown in FIGURE 3 and contact FP2 of relay FP (FIGURE 1) changes over from the position shown in FIGURE 3. Thus the reference phase winding is energized only from the moment of closing switch ILS or GCA, when relay FP becomes energized, until the end of the glide phase when relay A becomes energized also and contact A5 changes over.

The connection to amplifier 46 (FIGURE 1) is taken from between the amplifiers 60 and 61.

It will be seen that in operation, when relay FP is energized and relay A is not energized, the system operates as a conventional electro-mechanical integrator, the movable tap of potentiometer 65 being positioned in accordance with the mean value of the aircraft's pitch attitude during the glide phase. The time constant of the integrator is about 30 seconds.

During the glide phase, the signal passed to the amplifier 46 is at any instant representative of any difference between the aircraft's actual pitch attitude and the pitch attitude represented by the instantaneous setting of the potentiometer 65. This is, however, of no account since the output of amplifier 46 is not used during the glide phase.

When the end of the glide phase is reached, relay A is energized and contact A5 changes over, de-energizing the reference phase winding of the motor 62. From this moment the position of the shaft of the motor 62, and therefore of the tap of the potentiometer 65, is frozen, and the potential at the tap of the potentiometer 65 represents the quantity $\theta_d$. If subsequently there is any variation in the aircraft's pitch attitude, as represented by the signal from the vertical gyroscope 14, the output of the amplifier 60 which is passed to the input of amplifier 46, is, as required, representative of any difference between the actual pitch attitude $\theta$ and the datum attitude $\theta_d$ computed during the glide phase.

In a modification of the arrangement shown in FIGURE 1, an alternative form of the servo system for driving the cylinder 1 is used. With the alternative servo system the two demand signals from the contact FD1 and the network 111 are supplied respectively to two direct current control-inputs of a magnetic amplifier which has, in all, three such inputs. A direct-current degenerative-feedback signal of the servo system is supplied to the third input of the magnetic amplifier. The output alternating current signal of the magnetic amplifier is supplied to a filter for removing harmonic frequency modulation-components and thence through an amplifier to be supplied as an input demand to a servo amplifier controlling the servo motor. The signal derived by a tachometer generator, which generator is driven by the motor together with the cylinder 1, is supplied to the servo amplifier to be combined degeneratively with the input demand signal. The input demand signal supplied to the servo amplifier is also supplied to a degenerative-feedback path which derives the feedback signal supplied to the said third input of the magnetic amplifier. This feedback path includes a demodulator for demodulating the demand signal and a shaping network for suitably shaping the feed-back signal.

Having thus described my invention, I claim:

1. A visual indicating system for use in an aircraft, comprising an indicator arrangement responsive to any demand signal supplied thereto to provide a moving optical stimulus the rate and sense of movement of which is dependent upon the magnitude and sense of the demand represented by the demand signal; means for deriving an altitude signal varying with variations in the height of said aircraft, switching means switchable from one to another of three states and responsive to said altitude signal to be switched from a first to a second of said three states when, as represented by said signal, the aircraft has descended to a first predetermined height, and to be switched from the second state to the third state when, as represented by said signal, the aircraft has descended further to a second predetermined height; means for monitoring the position of said aircraft relative to a radio-defined glide path; means for monitoring the pitch attitude of said aircraft; and computing means which has three modes of operation and is responsive to the state of said switching means to adopt a first of the three modes of operation when the switching means is in its first state, to adopt a second of the three modes when the switching means is in its second state, and to adopt the third mode of operation when the switching means is in its third state; said monitoring means being coupled to said computing means for supplying input signals to said computing means related to the parameters being monitored; said computing means in its first mode of operation being responsive to an input signal dependent upon deviation of the aircraft from said radio-defined glidepath to supply to said indicator arrangement as said demand signal a signal which demands change in aircraft pitch attitude required for flight along the glidepath, the computing means in its second mode being responsive to an input signal representative of a mean value of pitch attitude applicable to flight along the glidepath to supply to said indicator arrangement as said demand signal a signal which demands change in aircraft pitch attitude required for flight along an extension of the glidepath, and said computing means in its third mode being responsive to input signals dependent respectively upon the aircraft height $h$ relative to a predetermined level and of the aircraft pitch attitude $\theta$, to supply to said indicator arrangement as said demand signal a signal which has at least two components and which demands change in pitch attitude required for flight of the aircraft in accordance with a predetermined path during the flare phase of landing, a first of said two components being representative of a predetermined function of $(1+KD)h$, where K is a constant and D is the operator representative of differentiation with respect to time, and the second component being representative of a predetermined function of the pitch attitude $\theta$; means for supplying a signal dependent upon the angular position of the aircraft elevators relative to the aircraft, and means responsive to said elevator angular position signal to supply, at least as a third component of the demand signal supplied during said third mode of operation, a signal which is representative of a predetermined function of said angular position.

2. A visual indicating system according to claim 1 wherein said predetermined function of said angular position is an algebraic linear function operated upon by a function of the operator D.

3. A visual indicating system for assisting a pilot of an aircraft during landing, comprising: indicator means adapted to be mounted within the periphery of the field of view of the pilot and controllable to provide a moving optical stimulus for conveying to the pilot directions for maneuver of said aircraft in pitch; first signal generating means responsive to the altitude of said aircraft for providing a first signal dependent upon a function of the height $h$ of said aircraft relative to a predetermined level; second signal generating means responsive to the attitude of said aircraft for providing a second signal dependent upon a function of pitch attitude $\theta$ of said aircraft; third signal generating means for providing a third signal dependent upon a function of the angular-position $\eta$ of elevator control-surfaces of said aircraft; control means coupled to said first, second, and third signal generating means for deriving in accordance with said first, second and third signals a demand for change in pitch attitude of said aircraft required for flare-out of the flight-path of said aircraft according to a predetermined control law, said demand having three components dependent respectively upon said first, second and third signals; and further control means responsive to said demand for controlling said indicator means to provide said moving optical stimulus at a rate and sense of movement dependent respectively upon the magnitude and sense of said demand.

4. A visual indicating system according to claim 3 wherein said indicator means comprises a cylindrical member mounted for rotation about its longitudinal axis, an enclosure enclosing said cylindrical member and having a longitudinal aperture for exposing a longitudinal strip of the cylindrical surface of said member, and means for causing light to be radiated through said aperture from those parts of said cylindrical surface which are exposed by the aperture and which appertain to a continuous helical area of at least two complete turns of said cylindrical member, said further control means including means responding to said demand to rotate said cylindrical member about its longitudinal axis at a rate and in a sense dependent respectively upon the magnitude and sense of the change in pitch attitude demanded.

5. A visual indicating system according to claim 3 wherein said indicator means comprises two indicators that are both controllable to provide said moving optical stimulus, said further control means including means for controlling each of said indicators to provide said moving optical stimulus with a rate and sense of movement dependent respectively upon the magnitude and sense of said demand.

6. A visual indicating system according to claim 3 wherein said control means for deriving said demand includes means responsive to said first signal for causing said first component of said demand to be representative of a predetermined function of the expression $(1+KD)h$, where K is a constant and D is the operator representative of differentiation with respect to time.

7. A visual indicating system according to claim 3 including a device that is settable in accordance with a selected height $h_d$ of a datum altitude level relative to said predetermined level, said datum level being a level with respect to which the flight-path of the flare-out is to be substantially asymptotic, means responsive both to said first signal and to the setting of said settable device to derive a further signal that is dependent upon the expression $(1+KD)(h-h_d)$, where K is a constant and D is the operator representative of differentiation with respect to time, and said control means for deriving a demand including means responsive to said further signal to provide said first component of said demand as a function of said expression.

8. A visual indicating system according to claim 7 including integrating means for deriving from said further signal a signal that is dependent upon a time-integral of said expression, said means responsive to said further signal including means responsive also to said time-integral signal to provide said first component in accordance with the sum of said expression and said time-integral.

9. A visual indicating system according to claim 3 wherein said control means for deriving a demand includes means operative to vary said second component of the demand in accordance with an algebraic linear function of the pitch attitude $\theta$, operated upon by a function of the differential operator D representative of differentiation with respect to time.

10. A visual indicating system according to claim 3 wherein said control means for deriving a demand includes means operative to vary said third component of the demand in accordance with an algebraic linear function of the angular-position $\eta$, operated upon by a function of the differential operator D representative of differentiation with respect to time.

11. A visual indicating system according to claim 3 wherein said control means for deriving said demand comprises means selectively switchable into any one of a plurality of operative states, said selectively-switchable means when in a predetermined one of said states being operative to derive said demand for change in pitch attitude required for flare-out, an altimeter for providing a signal representative of the height of said aircraft, and switching means responsive to said signal representative of height to switch said selectively-switchable means into said predetermined one of said operative states when said aircraft has descended to a predetermined height.

12. A visual indicating system according to claim 11 wherein said selectively-switchable means includes means switchable from one to another of three operative states, said switching means being responsive to said signal representative of height to switch said selectively-switchable means from a first to a second of said three states when said aircraft has descended to a first predetermined height, and from said second state to the third state when said aircraft has descended further to a second predetermined height, means for providing two signals that are dependent respectively upon deviation of said aircraft from a radio-defined glidepath and upon deviation of said aircraft from an extension to said glidepath, and said selectively-switchable means when in said first, second and third states being operative respectively in three distinct modes of operation, namely a first mode in which said selectively-switchable means is responsive to said signal dependent upon deviation of the aircraft from said radio-defined glidepath to derive a demand for change in pitch attitude required for flight of said aircraft along said glidepath, a second mode in which said selectively-switchable means is responsive to said signal dependent upon deviation from said glidepath-extension to derive a demand for change in pitch attitude required for flight of said aircraft along said extension to the glidepath, and a third mode in which said selectively-switchable means is responsive to said first, second and third signals to provide said demand for change in pitch attitude required for flare-out.

13. A visual indicating system according to claim 12 including a pitch-attitude device for providing a signal representative of the pitch attitude $\theta$, means for computing a mean value of pitch attitude $\theta_d$, during operation of said selectively-switchable means in said first mode and, following switching of said selectively-switchable means from said first mode to said second mode of operation, to supply a difference signal dependent upon the difference between the aircraft pitch attitude $\theta$ and said mean value of pitch attitude, $\theta_d$, said selectively-switchable means when operative in said second mode being responsive to said difference signal to include a component dependent thereupon in the said demand for change in pitch attitude required for flight along said extension to the glidepath.

14. A visual indicating system according to claim 12 wherein said selectively-switchable means when operative in said second mode is also responsive to said third signal to include a component dependent thereupon in said demand for change in pitch attitude required for flight along the extension to the glidepath.

15. In an aircraft, a visual indicating system according to claim 3 including means mounting said indicator means within the periphery of the field of view of the pilot of said aircraft when the pilot is stationed in his operational position and is looking in a general direction forward through the aircraft windscreen, said mounting means positioning said indicator means so that said movement of said optical stimulus occurs as a movement along a line that is approximately parallel to the line of sight of the pilot when he is looking in said general direction.

16. A system according to claim 15 wherein said indicator means comprises two indicators that are both controllable to provide said moving optical stimulus, said further control means including means for controlling each of said indicators to provide said moving optical stimulus with a rate and sense of movement dependent upon the magnitude and sense of said demand, and means mounting said two indicators at positions lying respectively on opposite sides of the pilot with said movement of said optical stimulus of each indicator being substantially parallel to said line of sight.

17. A system according to claim 15 wherein said indicator means includes a cylindrical member mounted for rotation about its longitudinal axis with said longitudinal axis being disposed approximately parallel to said line of sight, an enclosure enclosing said cylindrical member and having a longitudinal aperture for exposing to the pilot in the periphery of his field of view a longitudinal strip of the cylindrical surface of said member, said cylindrical member having on its cylindrical surface a helical area which extends for at least two complete turns of said member and which is of a distinctive color with respect to the remainder of said cylindrical surface.

18. A visual indicating system for use in an aircraft, comprising an indicator arrangement responsive to any demand signal supplied thereto to provide a moving optical stimulus the rate and sense of movement of which is dependent upon the magnitude and sense of the demand represented by the demand signal; said indicator arrangement providing said moving optical stimulus including a cylindrical member mounted for rotation about its longitudinal axis and having on its cylindrical surface an optically distinctive band which extends helically around said member, an enclosure for the cylindrical member, said enclosure being provided with means exposing a longitudinal strip of the cylindrical surface of said member, and means mounting said enclosure to position said exposed strip within the periphery of the field of view of the pilot of the aircraft when the pilot is stationed in his operational position and is looking in a general direction forward through the aircraft windscreen; means for deriving an altitude signal varying with variations in the height of said aircraft, switching means switchable from one to another of three states and responsive to said altitude signal to be switched from a first to a second of said three states when, as represented by said signal, the aircraft has descended to a first predetermined height, and to be switched from the second state to the third state when, as represented by said signal, the aircraft has descended further to a second predetermined height; means for monitoring the position of said aircraft relative to a radio-defined glidepath; means for monitoring the pitch attitude of said aircraft; and computing means which has three modes of operation and is responsive to the state of said switching means to adopt a first of the three modes of operation when the switching means is in its first state, to adopt a second of the three modes when the switching means is in its second state, and to adopt the third mode of operation when the switching means is in its third state; said monitoring means being coupled to said computing means for supplying input signals to said computing means related to the parameters being monitored; said computing means in its first mode of operation being responsive to an input signal dependent upon deviation of the aircraft from said radio-defined glidepath to supply to said indicator arrangement as said demand signal a signal which demands change in aircraft pitch attitude required for flight along the glidepath, the computing means in its second mode being responsive to an input signal representative of a mean value of pitch attitude applicable to flight along the glidepath to supply to said indicator arrangement as said demand signal a signal which demands change in aircraft pitch attitude required for flight along an extension of the glidepath, and said computing means in its third mode being responsive to input signals dependent respectively upon the aircraft height $h$ relative to a predetermined level and of the aircraft pitch attitude $\theta$, to supply to said indicator arrangement as said demand signal a signal which has at least two components and which demands change in pitch attitude required for flight of the aircraft in accordance with a predetermined path during the flare phase of landing, a first of said two components being representative of a predetermined function of $(1+KD)h$, where $K$ is a constant and $D$ is the operator representative of differentiation with respect to time, and the second component being representative of a predetermined function of the pitch attitude $\theta$.

References Cited

UNITED STATES PATENTS 3,115,319  12/1963  Glaser et al. _____ 244—77

MARTIN P. HARTMAN, *Primary Examiner.*

U.S. Cl. X.R.

244—77